2,420,597

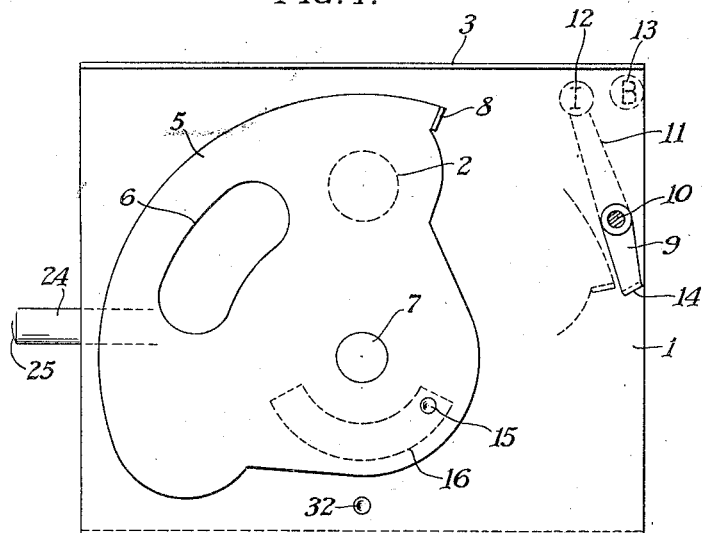
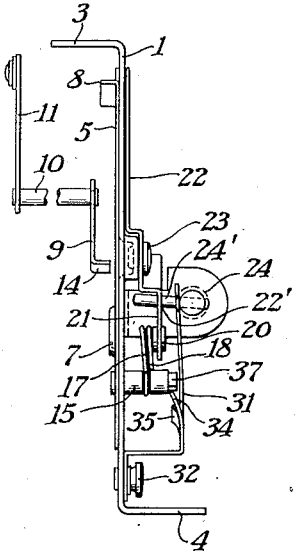
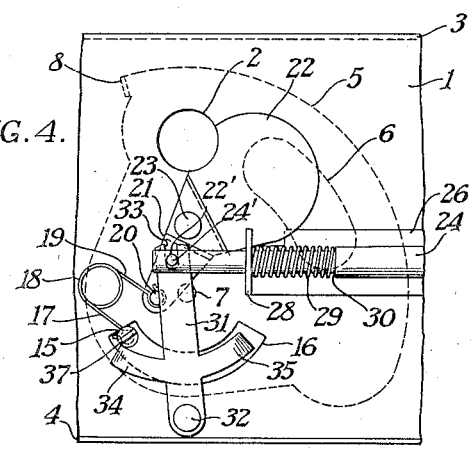
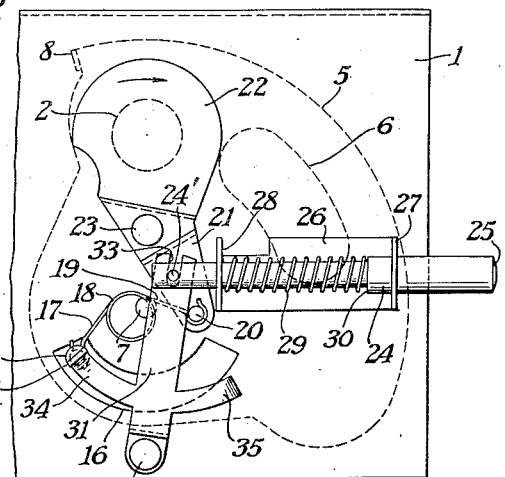
MILLER R. HUTCHISON, JR.
ALOIS L. WEHR
INVENTORS May 13, 1947. M. R. HUTCHISON, JR., ET AL 2,420,597
INEXPENSIVE CAMERA SHUTTER
Filed March 27, 1945 2 Sheets-Sheet 2
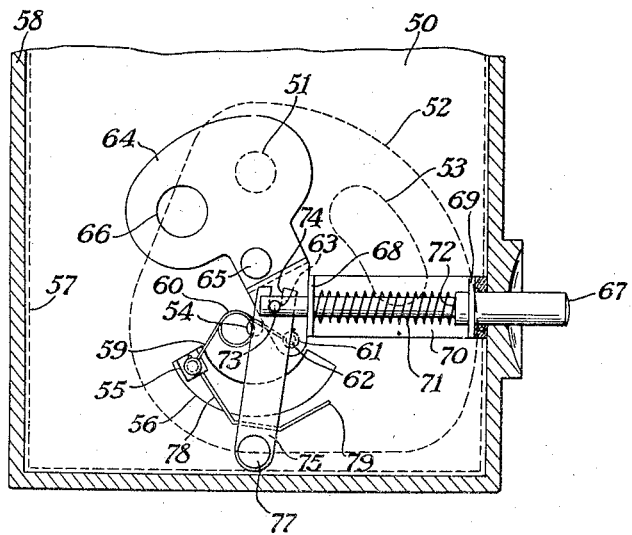
FIG. 6.
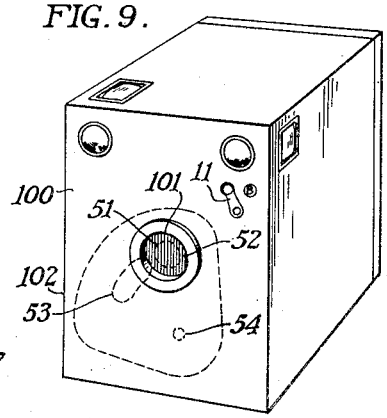
FIG. 9.
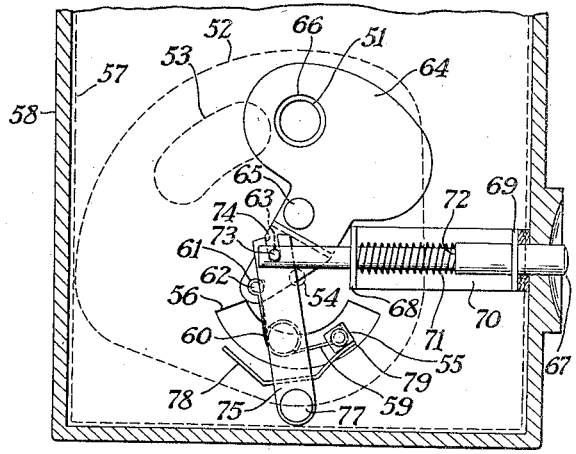
FIG. 7.
FIG. 8.
MILLER R. HUTCHISON, JR.
ALOIS L. WEHR
INVENTORS
BY
ATTORNEYS Patented May 13, 1947

UNITED STATES PATENT OFFICE 2,420,597

INEXPENSIVE CAMERA SHUTTER

Miller R. Hutchison, Jr., and Alois L. Wehr, Rochester, N. Y., assignors to Eastman Kodak Company, Rochester, N. Y., a corporation of New Jersey Application March 27, 1945, Serial No. 585,068

10 Claims. (Cl. 95—60)

This invention relates to photography and more particularly to shutters for photographic cameras. One object of our invention is to provide an inexpensive shutter which can be easily assembled. Another object of our invention is to provide a shutter which is neat in appearance when mounted on a camera. Another object of our invention is to provide a shutter in which the shutter blade will always produce an exposure of exactly the same duration when the shutter is set for "instantaneous" exposures. A still further object of our invention is to provide a shutter in which the shutter blade is cushioned at each end of its stroke and in which the noise of operation of the shutter is greatly minimized. A still further object of our invention is to provide a shutter blade rebound checking device, and to also employ the rebound checking device as a means for determining the power stored in a shutter blade driving spring before releasing the shutter blade. Other objects will appear from the following specification, the novel features being particularly pointed out in the claims at the end thereof.

Coming now to the drawings wherein like reference characters denote like parts throughout:

Figure 1 is a front elevation of a shutter constructed in accordance with and embodying a preferred form of our invention;

Figure 2 is a side elevation of the shutter shown in Figure 1;

Figure 3 is a fragmentary view showing a back elevation of the shutter shown in the preceding figures and with the parts in a normal position of rest;

Figure 4 is a fragmentary view similar to Figure 3 but with the parts in a position for the shutter blade to be released;

Figure 5 is a view similar to Figure 4 but with the parts in the position they assume after an exposure has been made and just before the trigger has been completely released;

Figure 6 is a front elevation of a shutter constructed in accordance with a second embodiment of our invention with the shutter parts in a normal position of rest;

Figure 7 is a view similar to Figure 6 but with the shutter parts in a released position;

Figure 8 is a plan view of the shutter mechanism shown in Figures 6 and 7; and

Figure 9 is a perspective view of an inexpensive camera equipped with a shutter constructed in accordance with our invention.

In the past it has been customary to provide shutter structures for inexpensive cameras of a series of parts generally mounted on one side of a supporting plate and with such shutters it has been practically impossible to conceal some of the working parts of the shutter. In a great many cameras now on the market, the shutter blades are actuated by a hairpin spring which spring is visible through the opening in the front wall of the camera and thus the camera is more or less disfigured. With our improved construction, we provide a shutter which has an extremely neat appearance since only the smooth, flat shutter blade can be seen from the front of the camera, thus making a more attractive construction. In addition, by mounting the shutter blade on one side of a supporting plate and the cover blind and mechanism on the opposite side of the plate, we are able to produce an inexpensive shutter which can be readily assembled and which can be made to include a very satisfactory type of light lock between the shutter parts and the supporting plate with the exposure aperture therein.

In the first described embodiment of our invention, shown in Figures 1 to 5 inclusive, the shutter may consist of a supporting plate 1, having an exposure aperture 2, and including flanges 3 and 4 which may be formed in opposite directions. The reason for these flanges in this embodiment of our invention is that they merely serve to support the shutter plate 1 in the desired position in a camera. Obviously, these may be omitted or changed to suit the particular camera in which the shutter is to be mounted.

The shutter includes a shutter blade 5 having an exposure opening 6 here shown in the form of an elongated slot. The shutter may be mounted on a stud 7 carried by the shutter plate 1. The shutter plate 5 is provided with a lug 8 which projects from the plane of the shutter and which is used to hold the shutter with the exposure slot 6 over the exposure aperture 2 where "bulb" exposures are to be made. A bulb lever 9 may be pivoted at 10 to the shutter plate 1 and preferably includes a setting arm 11 which may be moved from a position indicated by "I" at 12 to a position indicated by "B" at 13 to produce instantaneous or bulb exposures. When in the "I" position, a lug 14 extending downwardly from the lever 9 lies outside of the path of the lug 8 carried by the shutter plate 5 as indicated in Figure 1. When, however, the lever 11 is swung to the "B" position, the lug 14 is swung into the path of the lug 8 on the shutter blade 5 and is thereby held over the exposure aperture 2 to produce a prolonged exposure. Such constructions are not new.

The shutter blade 5 carries a pin 15 which projects through a slot 16 in the shutter plate 1. This pin serves several purposes. First, it is used to support one end 17 of a driving spring 18, the other end of which 19 engages a pin 20 forming the driving structure for the cover blade 5. The pin 20 is carried by the arm 21 of a cover blind 22 pivotally mounted on a stud 23 passing into the shutter supporting plate 1. The second function of the pin 15 is to form a latch element which may be used to definitely hold the blade after movement in either direction, and a third function of this pin is to hold the blade with other mechanism to be hereinafter more fully described until the hairpin spring 18 is tensioned to a predetermined degree. It also limits the stroke of the shutter blade by striking the end of slot 16.

The cover blind 22 is moved in one direction by a rod 24 terminating in a rounded end 25 which serves as the trigger for the camera. The rod 24 is mounted to slide on a bracket 26, this bracket having upstanding ears, 27 and 28, forming bearings for the rod. A spring 29 lies between the ear 28 and a shoulder 30 on the rod 24 and thus holds the parts in the Figure 3 position which is the normal position of rest. In making an exposure the trigger 25 is depressed, compressing the spring 29 as indicated in Figure 4. The first part of the trigger movement moves the cover blind 22 to its Figure 4 position in which it clears the exposure aperture 2. Slight further movement from the Figure 4 position will cause the hairpin spring 18, which has now passed a dead center between the stud 7 and the pin 15, to swing the shutter blade 5 across the exposure aperture 2, thus making an exposure. When the trigger 25 is released, the spring 29, which is somewhat stronger than the hairpin spring 18, will move the rod 24 in a reverse direction from that used in making an exposure and the cover blind 22 will move to again cause the hairpin spring to be tensioned and released to restore the shutter blade 5 to its Figure 3 position. In this movement the cover blind 22 fully covers the exposure aperture 2 before the shutter blade 5 returns to its initial position.

With the construction described above, the shutter would operate but the shutter blade would probably rebound to such an extent that light might be admitted through the opening 2 when the shutter comes to rest. In addition, the speed of the exposures would probably vary with the speed of operation of the trigger. In order to prevent these two difficulties, we have provided a rebound check and a blade-holding latch by means of the addition of a single double-armed lever.

A lever 31 is mounted on a stud 32 carried by the shutter plate 1. This lever includes a slotted end 33 which is engaged by a pin 24' carried by the rod 24. This pin extends down through the slotted end 33 of the lever and into a round aperture 22' in the cover blind arm 33. The rod 24 twists slightly as it rocks the cover blind 22 about its pivot 20. At the same time, the pin 24' operates the lever 31 about its stud 32.

The lever 31 is provided with a pair of oppositely extending spring arms 34 and 35. These spring arms are formed downwardly near the ends of the arms and when the trigger 25 is in its normal position of rest, arm 34 lies over the arcuate slot 16 and directly in the path of the pin 15. On the other hand, when the trigger is fully depressed the arm 35 lies over the opposite end of the slot 16 and directly in the path of the pin 15.

It will be noticed that the pin 15 has a generally rectangular shaped upper end or tongue 37, this tongue being provided so that it may engage the downwardly formed arms 34 or 35, to be slowed up thereby as the pin approaches one or the other of its two extents of movement. Also, the tongue 37 forms an element of a snap latch, which, together with the other snap latch elements 34 and 35 may hold the blade 5 in either of two positions. The snap latch elements may be readily adjusted that the spring 29 and the hairpin spring 18 must be tensioned to a given extent before the shutter blade 5 is released for movement. This is important because it assures exposures of the same duration at each actuation of the shutter. By holding the shutter blade until a predetermined spring tenison occurs it eliminates the difficulty of producing differently-timed exposures by more or less rapid operation of the trigger.

With the parts in the position shown in Figure 3, the spring latch arm 34 lies behind the shoulder of the rectangular end 37 of pin 15. By depressing the trigger 25, the arm 31 is rocked to the left with reference to this figure about the stud 32, at the same time the cover blind 22 is rocked to the right. Thus, the spring latch element 34 is slowly slid away from the rectangular end 37 and when a position just beyond the Figure 4 position is reached, the hairpin spring 18 will have been tensioned to a predetermined degree, and as soon as the latch element 34 completely clears the rectangular member 37, the shutter blade 5 will be actuated.

Since the arm 35 has been moved into the path of the pin 15 while the arm 34 is being moved away from the path the arm 35 is now in a position to slow up the pin 15 as it reaches the end of its stroke and to act as a shutter brake. The rectangular member 37 therefore slides under the spring arm 35, raising the spring arm until it may snap down behind the rectangular member on the stud 15. This temporarily latches the shutter blade 5 in the position it assumes after an exposure. However, this latching is only momentary since by releasing the trigger 25 the spring 29 rocks the lever 31 in an opposite direction. This releases the spring arm 35 from the rectangular member 37 as indicated in Figure 5, and by a slight further movement from the position of Figure 5 the cover blind 22 completely covers the exposure aperture 2 and the spring 18 is tensioned and released so as to drive the shutter blade 5 back to its original position. Here again the spring arm 34 is moved into the path of member 37 as the latch element 35 is removed from over the slot 16 so that spring arm 34 this time acts as a shutter brake and a latch. The shutter will then be latched in the Figure 3 position.

In the second embodiment of our invention shown in Figures 6 to 8 inclusive, a somewhat different structure is shown. In this form of our invention a shutter may consist of a shutter plate 50, having an exposure aperture 51, this aperture being normally covered by a shutter blade 52, having an exposure aperture 53. The shutter plate 52 is pivoted on a stud 54 and a square pin 55 may extend up through a slot 56 in the shutter plate 50. The shutter plate 50 may be supported in grooves 57, in camera walls 58, if desired, as indicated in Figure 8.

The pin 55 carries one end 59 of a hairpin spring 60, the other end of which 61 encircles a stud 62 on one arm 63 of a cover blind 64. This cover blind may turn on a stud 65 and carries an aperture 66 adapted to register with the exposure opening 51.

A trigger 67 may be in the form of a rod slidably supported in the ears 68 and 69 carried by a bracket 70. A spring 71 rests against the ears 68 and a shoulder 72. The trigger includes a pin 73 engaging the slotted end 74 of a lever 75 and also engaging in an aperture in the arm 63 of the cover blind. The lever 75 is pivoted on a stud 77 and includes a pair of spring arms 78 and 79 which are made of resilient material.

When the parts are in the position of rest shown in Figure 6, arm 78 engages one of the square sides of the pin 55. By depressing the trigger 67, the cover blind 64 is moved to the Figure 7 position, the arm 75 is rocked about its stud 77 to release the spring arm 78 from the pin 55 and the hairpin spring 60 swings the shutter blade 52 from its Figure 6 to its Figure 7 position. During this movement the spring arm 79 swings into the path of the side of the pin 55 and thereby slows up the movement of the shutter blade at the end of its stroke. The arm 79 latches the shutter blade against movement and serves as a shutter brake. When the trigger 67 is released, spring 71 causes a reverse movement to take place so that the arm 79 swings from the pin 55 and the arm 78 swings toward the pin to both act as a shock absorber and as a means for latching the pin 55 in its normal position of rest as shown in Figure 6.

From Figure 9 it will be noticed that both of the embodiments of our invention provide a neat structure because in each instance the front of the shutter plate carries only the shutter blade 5 or 52, as the case may be. In Figure 9 the camera 100 may be provided with the usual exposure opening 101 in the front wall 102 of the camera. The opening 101 in accordance with both embodiments of our invention is covered only by the shutter plate here shown as 5 and none of the operating mechanism can be seen through the opening 101 because it is all concealed behind the supporting plate 1 or 50, as the case may be. Thus, the shutter provides a neat appearance and enhances the general appearance of the camera.

With both embodiments of our invention the shutters are of extremely simple construction and they can be readily assembled on a shutter plate and tested and later placed in a camera. One of the advantages of providing the shutter blade on one side of the supporting plate is that the shutter blade can be made to lie flat against the shutter plate forming a light tight connection therewith, and by providing the driving spring on the opposite side of the pivot for the shutter blade from the side of the shutter plate carrying the exposure aperture, the tendency of this spring is not only to turn the blade upon its pivot 7, but to hold that portion of the shutter blade which carries the exposure aperture downwardly against the plate. Moreover by providing the shutter blade on one side of the supporting plate and the rest of the operating mechanism on the opposite side of the supporting plate, the parts can readily be pivoted to the supporting plate to the best advantage. In both forms of our invention the pivotal points of the shutter blade and the cover blind are offset one with respect to the other only a short distance and in a manner which would not be possible if the two parts were mounted on one side of the plate.

We have shown two preferred embodiments of our invention in the drawings and we consider as within the scope of our invention any shutter forms which may come within the scope of the appended claims.

We claim:

1. A shutter for cameras comprising, in combination, a supporting plate having an exposure aperture therein, a shutter blade pivotally mounted to one side of the exposure aperture on the supporting plate, an exposure aperture in the shutter blade, a pin carried by the shutter blade, an arcuate slot in the supporting plate through which said pin may swing, a cover blind pivotally mounted on the opposite side of the supporting plate and adapted to move to and from an exposure aperture covering position, a spring normally holding the cover blind covering the exposure aperture, a trigger connected to the cover blind for moving it against the spring, a hairpin spring connected to the cover blind and to the pin extending through the arcuate slot in the supporting plate and positioned to be tensioned and released by moving the cover blind in one direction, and a rebound control device directly connected to the cover blind to be moved thereby to and from a position to intercept the pin moving through the arcuate slot.

2. A shutter comprising an apertured supporting plate, an apertured shutter blade pivotally mounted on said plate and positioned to make an exposure when the apertured shutter blade swings across the aperture of the supporting plate from a rest position to an exposure completed position, a pivotally mounted cover blind, a hairpin spring connected to the shutter blade and cover blind, a trigger for moving the cover blind to tension and release the hairpin spring to move the shutter blade, and a lever pivotally mounted on the supporting plate and having a pin and slot connection with the cover blind to be moved thereby, a latch element carried by the shutter blade, and a spring latch element carried by the pivotally mounted lever and positioned to engage the latch element on the shutter blade when in a predetermined position, said latch elements being released only after a predetermined movement of the cover blind.

3. A shutter comprising an apertured supporting plate, an apertured shutter blade pivotally mounted on said plate and positioned to make an exposure when the apertured shutter blade swings across the aperture of the supporting plate from a rest position to an exposure completed position, a pivotally mounted cover blind, a hairpin spring connected to the shutter blade and cover blind, a trigger for moving the cover blind to tension and release the hairpin spring to move the shutter blade, and a lever pivotally mounted on the supporting plate and having a pin and slot connection with the cover blind to be moved thereby, a latch element carried by the shutter blade, and a pair of spring latch elements carried by the pivotally mounted lever and positioned to engage the latch element on the shutter blade when in either of two predetermined positions, said latch elements being released only after a predetermined movement of the cover blind.

4. A shutter comprising an apertured supporting plate, an apertured shutter blade pivotally mounted on said plate and positioned to make an exposure when the apertured shutter blade swings across the aperture of the supporting plate from a rest position to an exposure completed position, a pivotally mounted cover blind, a hairpin spring connected to the shutter blade and cover blind, a trigger for moving the cover blind to tension and release the hairpin spring to move the shutter blade, and a lever pivotally mounted on the supporting plate and having a pin and slot connection with the cover blind to be moved thereby, a latch element carried by the shutter blade, a pair of latch elements carried by the pivoted lever and positioned so that one lever latch element may engage the shutter blade latch element when the latter is in a rest position and the other lever latch element will engage the shutter latch element when in an exposure completed position, each latch element on the lever releasing the shutter latch element when the lever is moved a predetermined amount as the trigger moves to actuate the shutter.

5. A shutter comprising an apertured supporting plate, an apertured shutter blade pivotally mounted on said plate and positioned to make an exposure when the apertured shutter blade swings across the aperture of the supporting plate from a rest position to an exposure completed position, a pivotally mounted cover blind, a hairpin spring connected to the shutter blade and cover blind, a trigger for moving the cover blind to tension and release the hairpin spring to move the shutter blade, and a lever pivotally mounted on the supporting plate and having a pin and slot connection with the cover blind to be moved thereby, a latch element carried by the shutter blade, and a spring latch element carried by the pivotally mounted lever and positioned to snap over the latch element on the shutter blade as the latter moves to a position of rest.

6. A shutter comprising an apertured supporting plate, an apertured shutter blade pivotally mounted on said plate and positioned to make an exposure when the apertured shutter blade swings across the aperture of the supporting plate from a rest position to an exposure completed position, a pivotally mounted cover blind, a hairpin spring connected to the shutter blade and cover blind, a trigger for moving the cover blind to tension and release the hairpin spring to move the shutter blade, and a lever pivotally mounted on the supporting plate and having a pin and slot connection with the cover blind to be moved thereby, a latch element carried by the shutter blade, and a spring latch element carried by the pivotally mounted lever and positioned to snap over the latch element on the shutter blade as the latter moves to a position of rest, said latch element carried by the pivotally mounted lever swinging on the pivot from a latching position after the cover blind is moved to a predetermined amount by the trigger.

7. A shutter comprising an apertured supporting plate, an apertured shutter blade pivotally mounted on said plate and positioned to make an exposure when the apertured shutter blade swings across the aperture of the supporting plate from a rest position to an exposure completed position, a pivotally mounted cover blind, a pin carried by the shutter blade a hairpin spring connected to the shutter blade pin and cover blind, a trigger for moving the cover blind to tension and release the hairpin spring to move the shutter blade, and a lever pivotally mounted on the supporting plate and having a pin and slot connection with the cover blind to be moved thereby, said lever including a pair of oppositely disposed spring arms adapted to be moved so that one arm may engage the shutter blade pin near one extremity of movement and the other arm may engage the said pin at its other extremity of movement thereby forming shutter brakes for the shutter blade.

8. A shutter as defined in claim 7 in which the spring arms forming shutter brakes are positioned to definitely latch the pin carried by the shutter blade against movement.

9. A shutter as defined in claim 7 in which the spring arms forming shutter brakes are positioned to definitely latch the pin carried by the shutter blade against movement, each spring arm being moved from the pin by movement of the cover blind.

10. A shutter as defined in claim 7 in which the spring arms forming shutter brakes are positioned to definitely latch the pin carried by the shutter blade against movement, each spring arm being moved from the pin by movement of the cover blind, said hairpin spring connecting the shutter blade and cover blind being tensioned to a predetermined degree by movement of the cover blind before the spring arm releases its latching engagement with the shutter pin.

MILLER R. HUTCHISON, Jr.
ALOIS L. WEHR.

REFERENCES CITED

The following references are of record in the file of this patent:

UNITED STATES PATENTS

| Number | Name | Date |
| --- | --- | --- |
| 2,271,562 | Lotz | Feb. 3, 1942 |
| 2,238,491 | Hutchison, Jr. | Apr. 15, 1941 |
| 2,206,532 | Galter | July 2, 1940 |

FOREIGN PATENTS

| Number | Country | Date |
| --- | --- | --- |
| 507,594 | Germany | Sept. 18, 1930 |